United States Patent Office 3,209,655
Patented Oct. 5, 1965

3,209,655
PNEUMATIC SERVO SYSTEM
Laurence M. Hubby, Bellaire, Tex., assignor to Texaco Inc., New York, N.Y., a corporation of Delaware
Original application Jan. 15, 1959, Ser. No. 787,035, now Patent No. 3,096,641, dated July 9, 1963. Divided and this application Oct. 11, 1962, Ser. No. 235,593
2 Claims. (Cl. 91—52)

This application is a division of Serial No. 787,035, filed January 15, 1959, now Patent No. 3,096,641, granted July 9, 1963.

This invention is concerned with automatic measuring and recording of properties of a quantity of fluid. More specifically the invention is concerned with a pneumatic servo element used in the measurement of certain properties of crude oil, as it is being delivered to a customer, e.g. to a pipe line for transmission to some particular customer thereafter.

The invention is also concerned with an improved pneumatic servo system. Most especially with one that is adapted for use in a ticket printer, in accordance with the foregoing description.

It is another object of the invention to provide an improved pneumatic servo. This pneumatic servo has attributes such that it is able to provide relatively extended linear movement of a long element; the movement being in longitudinal translation thereof. Such servo movement is accomplished without undue hunting, or oscillation, of the long element.

Again briefly, the invention is concerned with an improvement in an pneumatic servo system. The pneumatic servo system is one for translating a signal pressure proportional to a given quantity into a relatively extended linear translation, that is in turn proportional to said signal. This servo system includes means for supplying a pneumatic fluid under a given pressure, and valves means for regulating the magnitude of pressure applied to a linear translation element dependent upon said signal pressure. The servo system also comprises means connecting said translation element to said valve means for causing said element to be translated a distance that is proportional to said signal pressure. In such a servo system, the invention is concerned with the improvement which comprises a cylinder and piston for actuating said linear translation element, and means included in said connecting means for coupling said piston to said valve means with a reduction in linear movement. The improvement also comprises a bleed orifice connected to said regulated pressure to damp the movements of said translation element.

Figure 1:
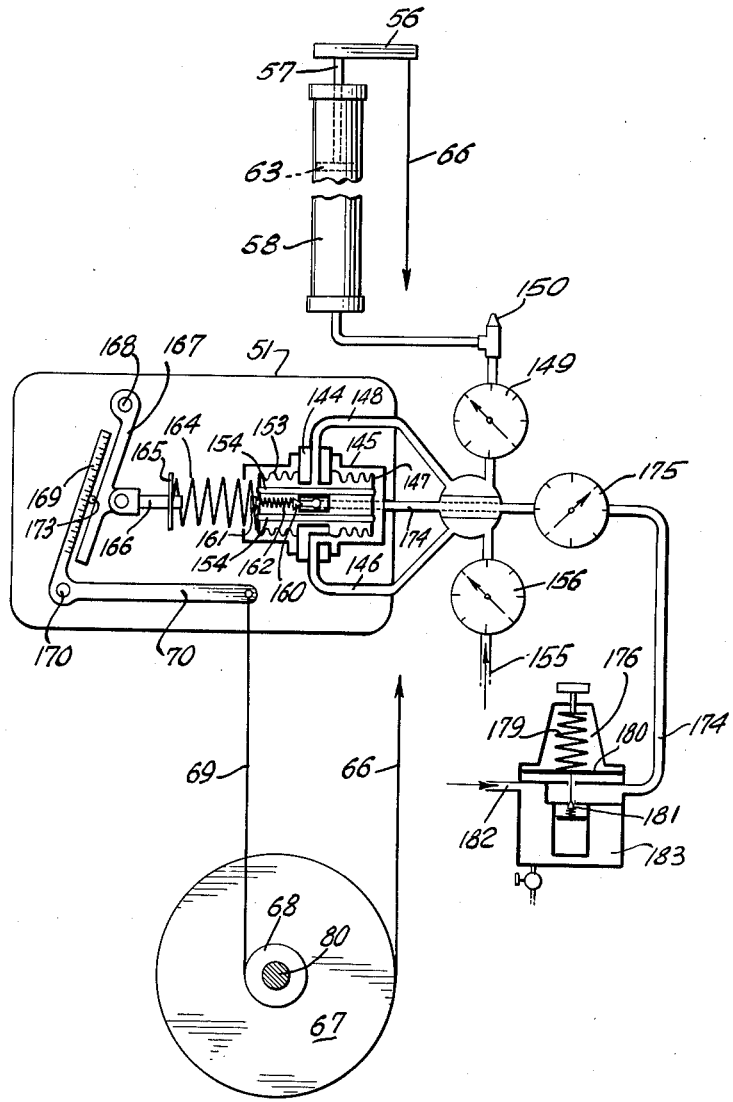
Figure 2:
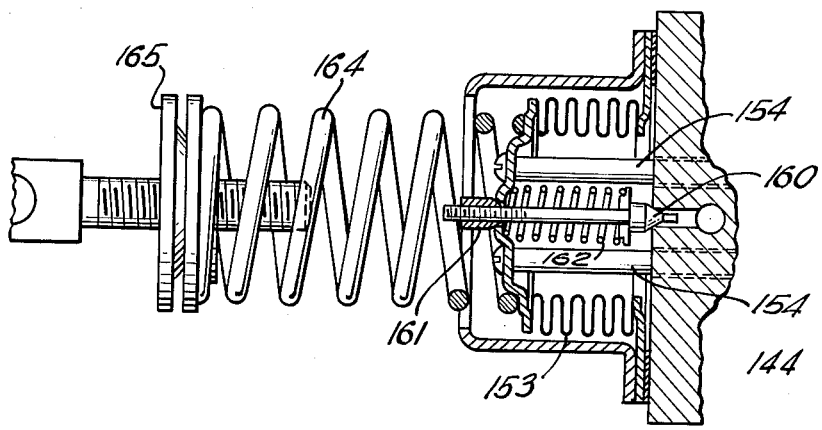

The foregoing and other objects and benefits of the invention may be more fully appreciated in connection with a specific embodiment thereof that is set forth below, and that is described in considerable detail in connection with the drawings, in which:

FIGURE 1 is a schematic showing of one of the pneumatic servo systems that carry out the positioning of the indicators, in accordance with the measured properties; and FIGURE 2 is an enlarged fragmentary showing relating to structure of the valve 161 and related elements.

Referring to the drawing figures, the operation of the pneumatic elements of a typical servo system, will be explained.

There is shown the flexible cable 66 which is attached to the large pulley 67; while the flexible cable 69 is attached to the smaller pulley 68. The pneumatic valve control elements that are located within a control box 51, are commercially available and form no part, per se, of the invention. However, in order to facilitate the understanding of the operation of the servo system, it is pointed out that there is a bellows actuated valve structure which includes the following elements. A sealed housing 145 has an inlet passage 146 connected to the inside of the housing. A bellows 147 is located inside of the housing 145, and has the open end of the bellows sealed to a base 144. The inlet passage 146 is connected to the inside of housing 145 on the outside of the bellows 147 through the base 144. There is another pneumatic fluid passage 148 that connects with the space inside of the bellows 147, and leads out to the cylinder 58 via a pressure gage 149. Also, there is a bleed orifice 150 connected to the path just described (passage 148).

The bellows 147 is rigidly connected to a similar bellows 153, by a pair of rods 154. The bellows 153 is also sealed at the open end thereof to the base 144 of the housing 145, similarly as the bellows 147. There are free passage ways surrounding the connecting rods 154 so that the pressure within both the bellows 147 and 153 will be directly transmitted to the passageway 148.

The inlet passage 146 is connected to a condition responsive, variable pressure passage 155 via a pressure gage 156.

The pressure within the bellows 147 and 153, is regulated by means of a pair of valves 160 and 161. These two valves 160 and 161 are rigidly attached together with a spacing such that under balanced conditions both valves are closed at the same time. There is a spring 162 under compression that urges the valves 160 and 161 to the closed position. It (spring 162) rests against the valve 160 at one end of the spring, and against the inside of the end plate of bellows 153 at the other end of the spring. The valve seat for valve 160 is carried by the base 144, while the valve seat for valve 161 is carried by the end plate of the bellows 153. The valve 160 acts as a control inlet valve for pneumatic fluid under pressure from a regulated source thereof. Valve 161 on the other hand acts as an exhaust valve for releasing pneumatic fluid from the interior space within the bellows 147 and 153.

There is a compression spring 164 that is adjustably pressed against the end of the bellows 153 so that it acts to tend to move the end plate of bellows 147 to the right (as viewed in FIGURES 1 and 2) against the pressure within the housing 145. The compression of the spring 164 is regulated by means of a collar 165 that is carried on a stub shaft 166 which is pivotally attached to a pivoted arm 167 which pivots about a pin 168 on the housing, or box 51. The extent of pivotal movement of the arm 167 is adjustably determined in accordance with the pivotal position of a pair of pivotal arms 70 and 169 that both pivot about a pin 170. The adjustment may be made by a sliding position for a stud 173 that determines the lever arm ratios in the transferral of movement between the arms 167 and 169. It will be appreciated that the arms 167 and 169 must be mounted in different planes so that they swing over and under one another without interference.

It is to be noted that there is a central, supply passageway 174 that delivers pneumatic fluid under pressure to the control system under control of the valve 160. This fluid is delivered from a regulated supply via a gage 175. The pressure of the supply fluid may be regulated by a pressure regulator 176 to any desirable pressure.

The pressure regulator 176 is a known device which maintains a constant pressure of fluid on the output side thereof i.e. in the passageway 174, by means of having a predetermined spring pressure set on a spring 179 that presses down against a diaphragm 180 and tends to open a valve 181 which is rigidly connected to the diaphragm 180. The fluid pressure is thus regulated by the tension on the spring 179. This is so because if the fluid pressure on the output side of the regulator 176, is less than the tension force of the spring 179, the valve 181 will be opened and fluid under pressure (from a source passage 182 into an interior chamber 183) will be allowed to flow past the valve 181 and into the space beneath the diaphragm 180. Then, as soon as the pressure has built up on the lower side of the diaphragm 180 it will overcome the force of the spring 179 and tend to close the valve 181. Thus, the pressure of the pneumatic fluid in the output passage 174 will be maintained at a desired regulated pressure.

*Operation of the pneumatic servo system illustrated in the figures*

First of all, it is to be noted that there is a large motion reduction linkage between the linear movement of the piston 63 (in the cylinder 58), and the linear movement of the collar 165 (which adjusts the tension on the spring 164). It is for this reason that the bleed orifice 150 is employed, to act as a damping force with regard to the movements of the piston 63. The extent of the movements of the piston 63 is determined by the inlet or control pressure that is applied to the servo system, i.e. at passage 155.

The servo system as schematically illustrated in the FIGURE 1 showing, acts to provide a linear positioning of the piston 63 (along with its piston rod 57) that is proportional to the control pressure which is a pressure proportional to a measured property of the crude oil, in a measured quantity of such oil. This is accomplished in the following manner. The control pressure of pneumatic fluid is introduced at the passageway 155 that is connected directly to the inlet passage 146. Therefore this pressure is applied to the outside of the bellows 147 but within the sealed housing 145. Assuming an increase, this pressure then causes the end plate of the bellows 147 to move to the left (as viewed in FIGURE 1) and thus moves the end plate of connected bellows 153 to the left the same amount. At the same time, this causes the valve 160 to be opened because the valve 161 (which is securely connected to the valve 160) is moved to the left with the end plate of the bellows 153. When the valve 160 is opened in this manner, it allows pneumatic fluid to flow from the central passageway 174 (regulated fluid supply) into the inside of the bellows 147 and 153 and to the passage 148. Then as soon as the pressure increase has caused the piston 63 to move enough to cause a readjustment of the tension on spring 164 sufficient to overcome the pressure increase, the bellows will be returned to the right and the valve 160 will be closed. Thus the piston 63 will take up a position within the cylinder 58, that is directly proportional to the pressure applied at passage 155.

Likewise, assuming a decrease in the control pressure; the force of the spring 164 will overcome the pressure outside of bellows 147, and the end plates of both bellows 147 and 153 will move to the right (as viewed in FIGURES 1 and 2). This will cause valve 161 to be opened (while valve 160 is pressed tighter closed), and pressure will be released from the inside of the bellows and consequently from within the cylinder 58. This reduction in pressure will, in turn, cause piston 63 to move back down and consequently the tension on spring 164 will be relieved until the valve 161 is closed once more.

It is pointed out that the servo follow-back connection between piston 63 and spring 164, includes a structure that has been already described in the parent case, now Patent No. 3,096,641. This structure includes the piston rod 57 and arm 56, to which is attached the flexible cable 66 that wraps around and is securely fastened to, the pulley 67. Then to continue the follow-back connection, there is the small diameter pulley 68 which is securely fastened to the larger pulley 67 for rotation therewith at all times. Pulley 68 has attached to the periphery thereof, another flexible cable 69 which is fastened, in turn, to the extremity of the pivoted arm 70. The pivoted arm 70 pivots about the pin 170 and causes arm 169 to move correspondingly about the pin 170. Consequently, the pivoted arm 167 is moved a proportionate amount about pin 168, depending upon the setting of the adjustable stud 173. Rotation of the arm 167 about its pivot pin 168 then causes a longitudinal translation of the stub shaft 166 that carries the collar 165, which in turn adjusts the tension on the spring 164.

Now it will be clear that when the control pressure applied by inlet passage 155 and inlet 146 to the inside of housing 145, is changed; the position of the bellows 147 will be shifted because of the unbalance between force due to pressure on the outside of the bellows 147, as opposed to spring compression force of spring 164. Such movement of the bellows 147 will make an adjustment of one of the valves 160 or 161, in the manner described above, so that the force of the compression spring 164 will be either increased or decreased to equalize the new force due to pressure on the outside of the bellows. In carrying this out the piston 63 (within the cylinder 58) will take up a position that corresponds with the pressure being applied, by reason of the fact that the piston rod 57 is working against the spring 73 (see FIGURE 3 of Patent No. 3,096,641), as the piston moves up within the cylinder.

In connection with the pneumatic servo system per se, it is to be noted that there is an additional motion damping device employed, i.e., in addition to the bleed orifice 150. This additional damping means takes the form of cylinder 75 (FIGURES 1 and 3 of Patent No. 3,096,641) which has a piston 76 that moves therein. The piston rod 77 is connected to the arm 56, which is attached to the piston rod 57 of the cylinder 58. This damping cylinder 75 might take various forms, but it is preferred to employ an oil filled cylinder that has a sufficient column of oil therein to maintain the piston 76 immersed in the oil throughout the full range of positions of the piston rod 57 of cylinder 58.

It will be observed that there are certain auxiliary features to prevent any faulty operations of the system. Among these is a pair of limit switches 190 and 191 (see FIGURE 3 of Patent No. 3,096,641) that are located so as to be actuated by the movement of arm 56 as it reaches the limiting positions thereof. These two limit switches are connected into the control circuit so as to prevent printing, if the type bar (strip 24) is positioned outside of the normal range therefore. There may be two other pairs of limit switches (not shown) one for each of the type bars, i.e., strips 38 and 39. However, switches 190 and 191 may be actuated by any of the three type bar positions is common, if the range of movements of all three are the same.

While there has been described a specific embodiment of the invention in considerable detail in accordance with the applicable statutes, this is not to be taken as in any way limiting the invention but merely as being descriptive thereof.

What is claimed as the invention is:

1. In a pneumatic servo system for translating a signal pressure proportional to a given quantity into a relatively extended linear translation proportional to said signal, including means for supplying a pneumatic fluid under a given pressure, valve means for regulating the magnitude of pressure applied to a linear translation element dependent upon said signal pressure, and mechanical means connecting said translation element to said valve means for causing said element to be translated a distance that is proportional to said signal pressure, the said means including a cylinder and piston for actuating said linear translation element, conduit means for connecting said valve means to said cylinder, means included in said mechanical connecting means for coupling said piston to said valve means with a reduction in linear movement, and a bleed orifice connected to said conduit means to damp the movements of said translation element.

2. In a pneumatic servo system for translating a signal pressure proportional to a given quantity into a relatively extended linear translation proportional to said signal, including means for supplying a pneumatic fluid under a given pressure, valve means for regulating the magnitude of pressure applied to a linear translation element dependent upon said signal pressure, and mechanical means connecting said translation element to said valve means for causing said element to be translated a distance that is proportional to said signal pressure, the said means including a cylinder and piston for actuating said linear translation element, conduit means for connecting said valve means to said cylinder, plural diameter pulley means included in said mechanical connecting means for coupling said piston to said valve means with a reduction in linear movement, and a bleed orifice connected to said conduit means to damp the movements of said translation element.

References Cited by the Examiner
UNITED STATES PATENTS

| | | |
|---|---|---|
| 192,273 | 6/77 | Nash. |
| 1,007,377 | 10/11 | Nielsen. |
| 2,558,295 | 6/51 | Griswold. |
| 2,618,286 | 11/52 | Johnson _____ 137—85 |
| 2,734,589 | 2/56 | Groen _____ 91—384 |
| 2,980,126 | 11/58 | Broerman _____ 137—85 |

FRED E. ENGELTHALER, *Primary Examiner.*